United States Patent
Thelen

(10) Patent No.: US 7,654,138 B2
(45) Date of Patent: Feb. 2, 2010

(54) METHOD AND DEVICE FOR DYNAMICALLY MEASURING THE UNBALANCE OF A ROTOR

(75) Inventor: Dieter Thelen, Modautal (DE)

(73) Assignee: Schenck RoTec GmbH, Darmstadt (DE)

( * ) Notice: Subject to any disclaimer, the term of this patent is extended or adjusted under 35 U.S.C. 154(b) by 0 days.

(21) Appl. No.: 12/084,816

(22) PCT Filed: Oct. 27, 2006

(86) PCT No.: PCT/EP2006/067896

§ 371 (c)(1),
(2), (4) Date: May 21, 2008

(87) PCT Pub. No.: WO2007/054445

PCT Pub. Date: May 18, 2007

(65) Prior Publication Data

US 2008/0289416 A1    Nov. 27, 2008

(30) Foreign Application Priority Data

Nov. 9, 2005    (DE) ................ 10 2005 053 786

(51) Int. Cl.
G01M 1/00    (2006.01)
(52) U.S. Cl. .................. 73/471; 73/66; 73/460; 73/468
(58) Field of Classification Search ........... 73/471, 73/66, 457, 460, 461, 468, 487
See application file for complete search history.

(56) References Cited

U.S. PATENT DOCUMENTS

| | | | | |
|---|---|---|---|---|
| 3,746,409 A | * | 7/1973 | Heiland | 384/215 |
| 3,812,725 A | * | 5/1974 | Frank et al. | 73/462 |
| 3,924,473 A | * | 12/1975 | Maus | 73/471 |
| 4,573,355 A | * | 3/1986 | Reutlinger | 73/455 |
| 4,726,690 A | * | 2/1988 | Thelen | 384/99 |
| 4,905,515 A | * | 3/1990 | Himmler | 73/471 |
| 5,219,454 A | * | 6/1993 | Class | 416/145 |
| 6,904,371 B2 | * | 6/2005 | Sonnichsen et al. | 702/56 |
| 7,252,000 B2 | * | 8/2007 | Care et al. | 73/462 |

FOREIGN PATENT DOCUMENTS

DE    2 141 792    2/1973

(Continued)

*Primary Examiner*—Hezron Williams
*Assistant Examiner*—Samir M Shah
(74) *Attorney, Agent, or Firm*—W. F. Fasse; W. G. Fasse

(57) ABSTRACT

Dynamically measuring the unbalance of a rotor arranged in a device housing (1) and rotating at high angular velocity, wherein the rotor is supported in a separate bearing housing (14), involves the following steps: fastening the bearing housing (14) on the device housing (1) with interposition of resiliently yielding elements (6) so that the bearing housing (14) can be moved relative to the device housing (1) in at least two spatial dimensions and the rotor is arranged in a working position in the device housing (1) suitable for driving, accelerating the rotor, measuring the vibrations induced by unbalance while the rotor rotates at a substantially normal working speed, determining the phase position of the induced vibrations to the relative position of the rotor at the measuring speeds, and using the measured vibrations and the phase position to determine the unbalance of the rotor to be compensated.

14 Claims, 2 Drawing Sheets

FOREIGN PATENT DOCUMENTS

| | | |
|---|---|---|
| DE | 2 215 002 | 10/1973 |
| DE | 24 53 292 | 5/1976 |
| DE | 32 47 503 | 1/1984 |
| DE | 37 16 210 | 12/1988 |
| DE | 197 54 321 | 6/1999 |
| DE | 695 24 906 | 8/2002 |
| EP | 502780 A1 * | 9/1992 |
| EP | 0 426 676 | 3/1993 |
| EP | 0 699 900 | 3/1996 |
| EP | 1 355 139 | 10/2003 |
| GB | 2 173 602 | 10/1986 |
| JP | 01200002 | 8/1989 |
| WO | WO 90/01154 | 2/1990 |

* cited by examiner

METHOD AND DEVICE FOR DYNAMICALLY MEASURING THE UNBALANCE OF A ROTOR

FIELD OF THE INVENTION

The invention relates to a method for dynamically measuring the unbalance of a rotor arranged in a housing and rotatable at high angular velocity, said rotor being mounted in a separate bearing housing, and to a device suitable for carrying out the method. In particular the invention relates to a method and a device for measuring the unbalance of the rotor of an exhaust gas-driven turbocharger.

BACKGROUND INFORMATION

Exhaust gas-driven turbochargers have a rotor which rotates in operation at a very high speed of frequently over 100,000 revolutions per minute and therefore has to be very accurately balanced for the avoidance of noises and excessive bearing loads. As a rule the rotor consists of a shaft supported in an associated bearing housing, said shaft carrying at one end a turbine wheel and at the other end a compressor wheel. For reasons of accuracy the unbalance of the rotor is measured at an angular velocity corresponding substantially to normal working speed, the rotor being rigidly installed with the bearing housing in a turbine housing and being brought to the necessary speed by applying compressed air to the turbine wheel. This method has the disadvantage that the relatively large mass comprising the bearing housing and turbine housing compared with the mass of the rotor greatly reduces the vibrations induced by the unbalance of the rotor and therefore the sensitivity and accuracy of the measurement.

From EP 0 426 676 B1 a dynamic balancing method for the high-speed rotor of an exhaust gas-driven turbocharger is known wherein the turbocharger centre housing in which the rotor is supported is rigidly connected to the housing portions enclosing the turbine wheel and compressor wheel and the unit formed thereby is soft-mounted in a framework to be movable in all three spatial dimensions with the aid of flexible bellows conduits that engage with the housing portions. Here too, the housing portions attached to the turbocharger centre housing substantially detract from the vibration characteristics and therefore from the measurement of the unbalance. On the housing portions acceleration sensors are arranged whose acceleration signals are processed in conjunction with an optically measured phase angle for determining the size and position of the unbalance.

SUMMARY OF THE INVENTION

The object of the invention is to provide a method of the kind initially mentioned which reduces the disadvantageous influence of the resonating mass and facilitates high accuracy of the measurement of unbalance. A further object of the invention is to create a particularly suitable device for carrying out the method.

According to the invention the method of dynamically measuring the unbalance of a rotor arranged in a housing and rotating at high angular velocity, the rotor being supported in a separate bearing housing, comprises the steps: fastening the bearing housing on the housing with interposition of resiliently yielding elements in such a way that the bearing housing has at least two degrees of freedom relative to the housing and the rotor is arranged in a working position in the housing suitable for driving, acceleration of the rotor to a substantially normal working speed, measuring the vibrations induced by unbalance while the rotor rotates at a substantially normal working speed, determination of the phase position of the vibrations induced by unbalance relative to the angular position of the rotor at the measuring speeds at which the vibrations induced by unbalance are measured, use of the measured vibrations induced by unbalance and of the phase position to determine the unbalance of the rotor to be compensated.

The method according to the invention has the advantage that only the rotor, the bearing housing and its bearing accommodated therein independently of further masses such as the mass of the housing and its fastening, experience vibrations induced by unbalance. The resonating mass of the measuring set-up is thereby restricted to the unavoidable minimum of the parts required for supporting the rotor and thus is substantially reduced in comparison with the prior art mentioned initially. This has the advantage that errors in the measurement of unbalance caused by resonating masses are substantially reduced and therefore the unbalance measurement is substantially more accurate.

For carrying out the method the invention provides for a device dynamically measuring the unbalance of a rotor supported in a bearing housing and rotatable at high angular velocity, with a housing to which the rotor and the bearing housing can be attached in a working position suitable for driving the rotor at a substantially normal working speed, wherein the housing has at least one resiliently yielding element to which the bearing housing can be fastened in such a way that it is movable in at least two spatial dimensions relative to the housing. The device according to the invention is simple and inexpensive to manufacture and allows highly accurate measurement of rotor unbalance.

A plurality of, in particular four, elements resiliently yielding in the axial and radial directions are preferably arranged on the device housing concentrically to the rotational axis of the rotor and with uniform spacing round the periphery. By means of such arrangement a resilient support of the bearing housing is achieved, which is of substantially identical stiffness in all radial directions.

According to a further proposal of the invention, the resiliently yielding elements can be interconnected on the fastening side for the bearing housing by means of a bearing ring, and fixing means for fixing the bearing housing can be provided on the bearing ring. This arrangement facilitates the handling of the device because the bearing housing does not have to be individually connected to the spring elements. In addition, the bearing ring allows an encapsulated arrangement of the spring elements, so that they cannot be damaged. Furthermore, by limiting the room for movement of the bearing ring the vibration amplitude of the rotor housing can be limited to a maximum value. According to the invention, vibration sensors, in particular acceleration sensors, can be arranged on the bearing ring.

According to a further proposal of the invention the resiliently yielding elements preferably have the form of a ring sector with a radially internal sector portion, a radially external sector portion and spring elements interlinking both sector portions. This arrangement of the resiliently yielding elements can be connected to the housing and the bearing ring in an advantageously simple manner and requires little axial space.

It has proven beneficial if the resiliently yielding elements are fastened with the radially internal sector portion on the housing and the radially external sector portion on the bearing ring, so that they do not project in the radial direction beyond the bearing ring. The spring elements which interconnect the two sector portions can be bent in an S- or Z-shape. This has the advantage that little radial space is required to achieve the necessary soft spring. The two sector portions and the spring elements interconnecting them can be manufactured integrally in a simple manner in one piece, for example from a spring sheet steel. This allows cost-effective manufacture.

Another advantageous embodiment of a device according to the invention provides for the housing to have two spring rods to which the bearing housing or the bearing ring can be fastened, the spring rods being arranged in a common plane parallel to the rotational axis of the rotor and extending in the direction of the rotational axis of the rotor. In this embodiment the bearing housing can be moved in all radial directions relative to the housing and can be rotated around a radial axis in the plane. The spring rods are preferably arranged in a vertical plane and each have at least one bending portion of lesser stiffness at the same region. The stiffness of the bending portion can be less in the horizontal direction than in the vertical direction. In particular, the stiffness of the spring rods in the horizontal direction can be approx. 10% of the stiffness of the spring rods in the vertical direction. The greater stiffness of the spring rods in the vertical direction serves to support the weight of rotor and bearing housing.

BRIEF DESCRIPTION OF THE DRAWINGS

The invention is explained hereinafter in more detail by reference to embodiments which are shown on the drawings, in which.

DETAILED DESCRIPTION OF EXAMPLE EMBODIMENTS OF THE INVENTION

Figure 1:
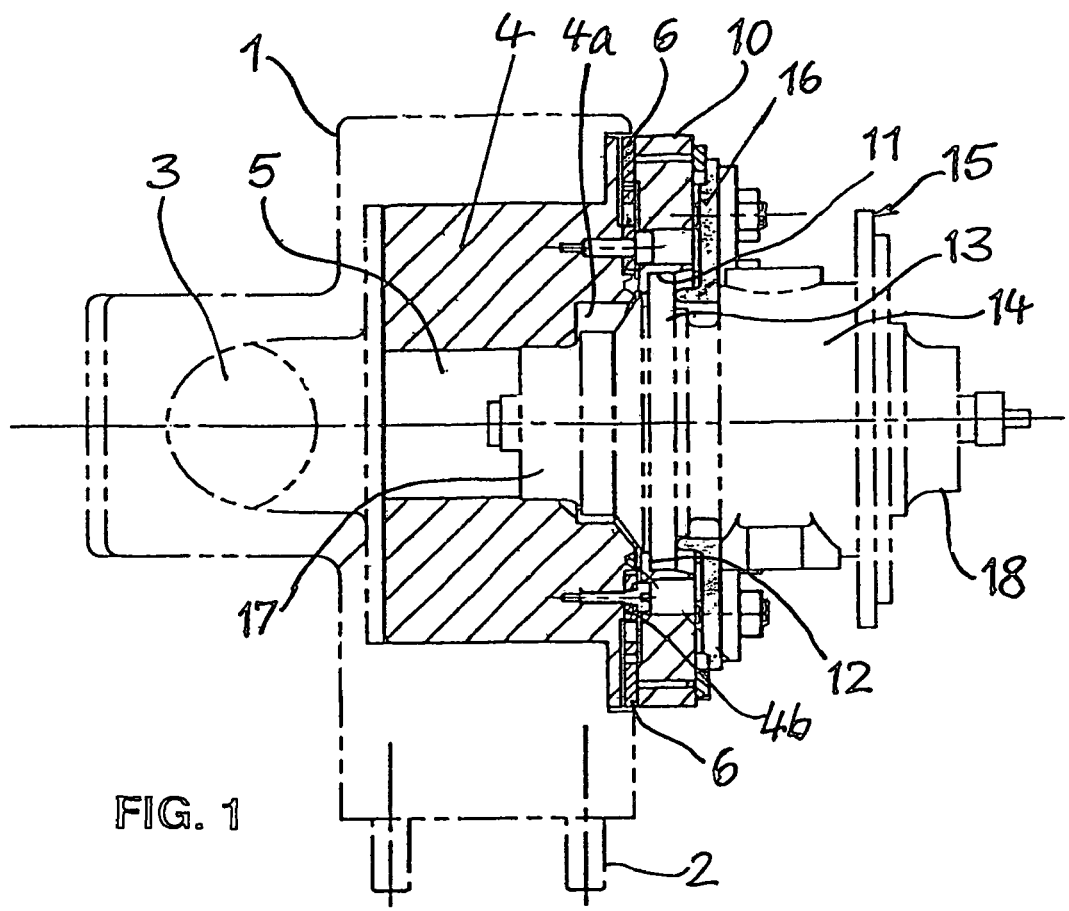
FIG. 1 is a cross-section of an unbalance measuring device according to the invention with a turbocharger cartridge assembly arranged therein.

The unbalance measuring device shown in FIG. 1 comprises a housing 1 which can be fastened on a pedestal or frame by means of bolts 2. The housing 1 contains a flow channel 3 and an annular spiral housing 4 whose central aperture 5 is connected to the flow channel 3. The spiral housing 4 has on the end face facing away from the flow channel 3 a spiral channel 4a and a ring face 4b concentric to its longitudinal central axis on which four resiliently yielding elements 6 of the same design are fastened by means of bolts each at the same distance from the longitudinal central axis and at the same distance from one another.

Figure 2:
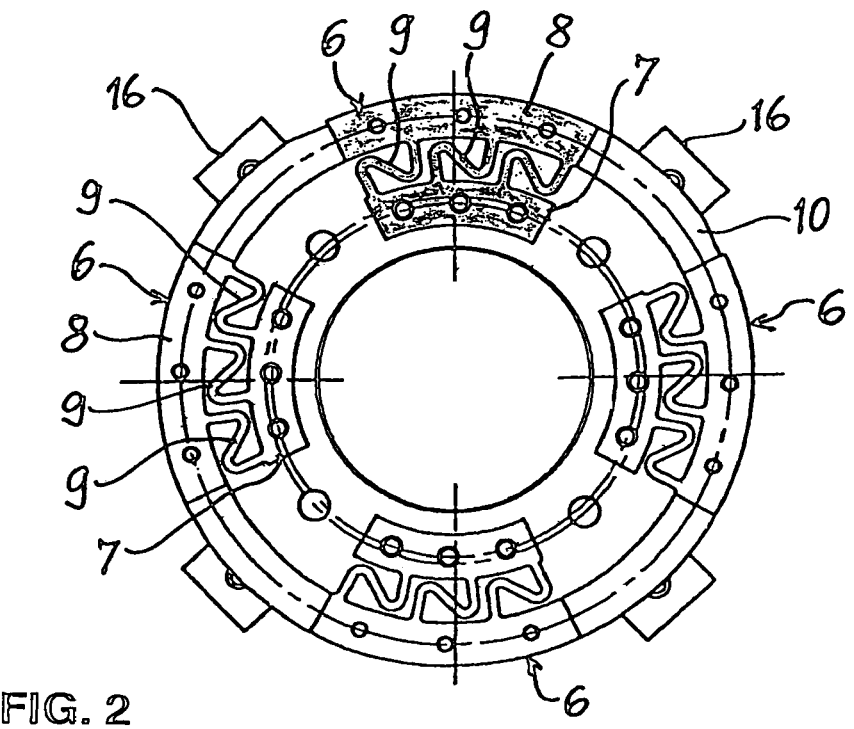
FIG. 2 is a view of the unit enclosing the resiliently yielding elements and the bearing ring of the device according to FIG. 1.

As can be seen from FIG. 2, the resiliently yielding elements 6 substantially have the shape of ring sector-shaped plates which are divided by recesses into a radially internal sector portion 7, a radially external sector portion 8 and Z-shaped spring elements 9 interconnecting the two sector portions. The elements 6 consist respectively of one piece and can be manufactured simply and cost-effectively by cutting out of a metal sheet of spring material, in particular spring steel.

The elements 6 are fastened to the spiral housing 4 with their internal sector portion 7 and extend radially outwards. To the external sector portions 8 of the elements 6 a bearing ring 10 is fastened by means of bolts on the side facing away from the spiral housing 4. The bearing ring 10 hereby rests with a raised ring surface against the sector portions 8 and in addition is at an axial distance from the spring element 9, sector portions 7 and also the spiral housing 4. The end face of the spiral housing 4 is set back axially in the region of the spring elements 9 and the sector portions 8, so that here also, an axial distance from the spring elements 9 and the sector portions 8 is provided. In addition there is an intermediate region between the radially external edges of the sector portions 8 and the housing 1. The sector portions 8 and the bearing ring 10 connected rigidly thereto can therefore, carried by the spring elements 9, execute radial and axial vibration movements relative to the housing 1 and to the spiral housing 4.

The bearing ring 10 has a central hole 11 with a shoulder 12. The hole 11 serves for accommodating a ring flange 13 provided at the bearing housing 14 of a turbocharger cartridge assembly 15 to be measured. After insertion of the turbocharger cartridge assembly 15 in the hole 11, the flange 13 is tensioned against the shoulder 12 with the aid of anchoring attachments 16 arranged on the bearing ring 10.

The turbocharger cartridge assembly 15 comprises in addition to the bearing housing 14 a shaft mounted therein, and a turbine wheel 17 and a compressor wheel 18, fastened at the opposing ends of the shaft. In the fixed position the turbine wheel 17 is located in the spiral channel 4a and in the aperture 5 of the spiral housing 4. Through the spiral channel 4a an airflow can be directed in suitable manner onto the turbine wheel 17 in order to drive it. The exhaust air is discharged via the aperture 5 and the flow channel 3. The internal contours of the spiral channel 4a and of the aperture 5 are designed in such a way that a sufficiently large distance to the turbine wheel 17 remains so that it cannot impact when the turbocharger cartridge assembly 15 vibrates. The compressor wheel 18 is arranged outside the housing 1. It is covered by a compressor housing or a protecting hood for conduction of the flow and for reasons of protection.

For measuring an unbalance of the rotor consisting of turbine wheel 17, shaft and compressor wheel 18 the turbine wheel 17 is driven by air and accelerated up to a speed corresponding substantially to the normal working speed. Through an existing unbalance of the rotor vibrations are hereby induced in the vibrating mass of the turbocharger cartridge assembly 15 and bearing ring 10 which are measured at various speeds with the aid of vibration and/or acceleration sensors arranged on the bearing ring 10. Simultaneously by means of a rotational angle sensor the respective phase position of the measured induced vibrations is determined in respect of the rotor. The relative position and size of the unbalance to be balanced are determined from the measured values with the aid of a computer.

Figure 3:
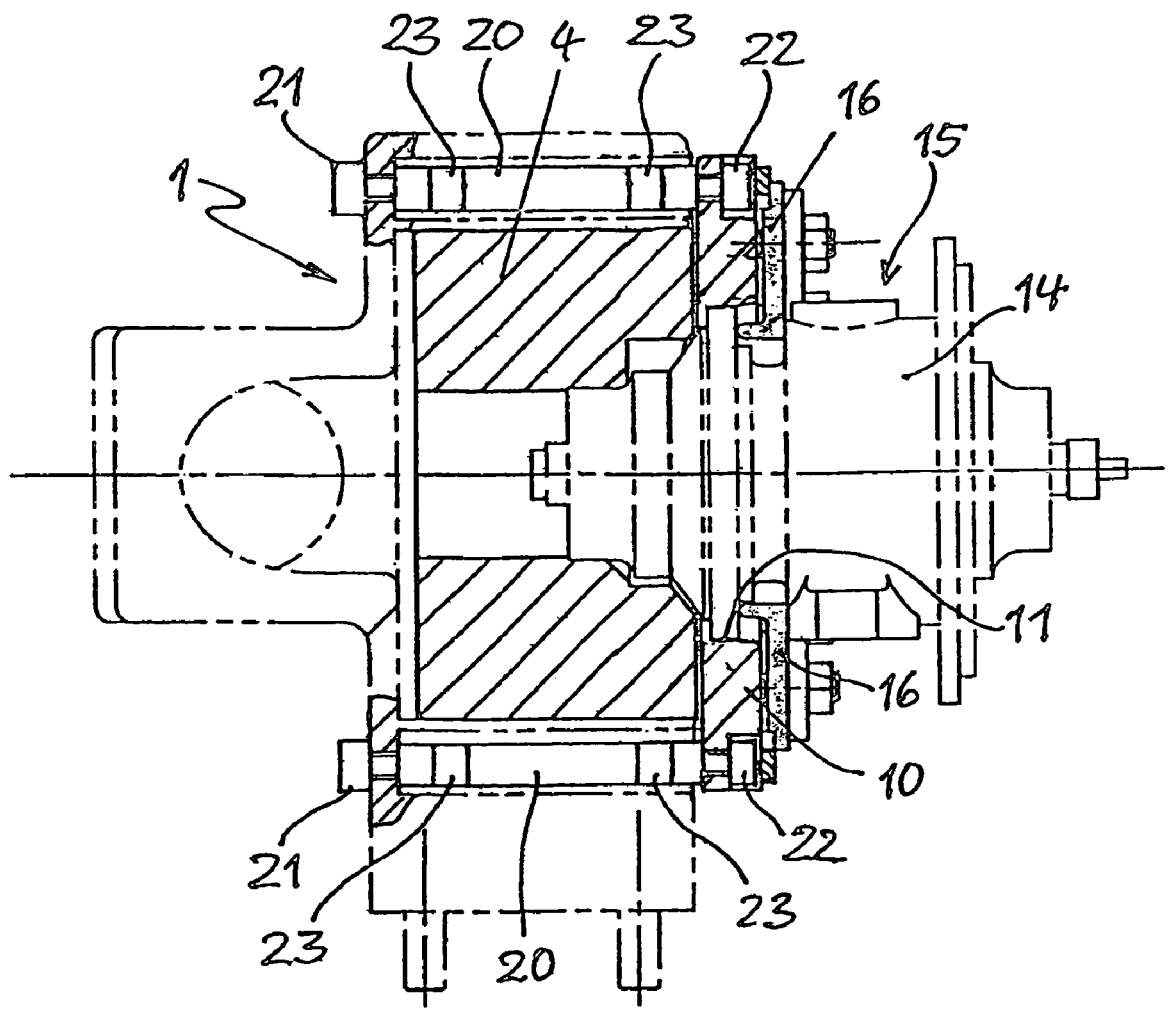
FIG. 3 is a cross-section of another embodiment of an unbalance measuring device according to the invention with a turbocharger cartridge assembly arranged therein.

FIG. 3 shows another development of an unbalance measuring device according to the invention, which like the previously described embodiment comprises a housing 1, a spiral housing 4 arranged therein and a bearing ring 10, in whose hole 11 the bearing housing 14 of a turbocharger cartridge assembly 15 to be measured can be fixed by means of anchoring attachments 16. As spring elements this embodiment has two spring rods 20 which are fastened at the one end by means of bolts 21 to the housing 1 and at the other end by means of bolts 22 to the bearing ring 10. The spring rods 20 are provided in clear spaces within the housing 1 and their longitudinal axes are disposed in a common vertical plane containing the rotational axis of the rotor of the turbocharger cartridge assembly 15 and are arranged in parallel and diametrically to the rotational axis of the rotor. At a small distance from their two ends the spring rods 20 have bending portions 23 of lesser stiffness which are formed by local mutually opposing flattened regions of the spring rods 20. The bending portions 23 are provided in such a way that their stiffness is about ten times greater in the direction of the vertical central plane common to the spring rods 20 than their stiffness in a perpendicular direction to the said central plane. Through the described design and arrangement of the spring rods 20 the bearing ring 10 and the turbocharger cartridge assembly 15 arranged therein are supported resiliently yielding at the housing 1 in such a way that it is movable in any radial direction, the stiffness of the support in the horizontal direction being less by about a factor of 10 than in the vertical direction. In addition a rotation of the bearing ring 10 with the turbocharger cartridge assembly held therein around a vertical axis lying in the central plane common to the spring rods 20 is possible. Support is therefore given with at least two degrees of freedom which are necessary for the accurate measurement of the rotor unbalance.

The described devices have the advantage that the resonating mass during measurement of unbalance is optimally low because it only encompasses the bearing housing of the turbocharger cartridge assembly and the means for its fixing, namely the bearing ring 10 including fixing means. With the described device it is therefore possible to achieve substantially greater accuracy of measurement compared with the prior art. The devices furthermore have the advantage that they are easy to handle and can be manufactured cost-effectively.

The invention claimed is:

1. Method for dynamically measuring the unbalance of a rotating rotor arranged in a device housing, the rotor being supported in a separate bearing housing, comprising the following steps:
fastening the bearing housing on the device housing with interposition of resiliently yielding elements such that the bearing housing has at least two degrees of freedom of motion relative to the device housing and the rotor is arranged in a working position in the device housing suitable for driving, wherein said resiliently yielding elements are resiliently yielding in axial and radial directions, and are arranged on the device housing concentrically to a rotational axis of the rotor and with uniform spacing around a periphery,
accelerating the rotor to a substantially normal working speed,
measuring vibrations induced by an unbalance of the rotor while the rotor rotates at least one measuring speed corresponding to the substantially normal working speed,
determining a phase position of the vibrations induced by the unbalance with respect to an angular position of the rotor at the at least one measuring speed at which the vibrations induced by the unbalance are measured, and
using the measured vibrations induced by the unbalance and using the phase position to determine the unbalance of the rotor to be compensated.

2. Device for dynamically measuring the unbalance of a rotatable rotor supported in a bearing housing, said device comprising a device housing to which the rotor and the bearing housing can be attached in a working position suitable for driving the rotor at a substantially normal working speed, and said device further comprising a plurality of resiliently yielding elements by which the bearing housing can be attached to the device housing such that the bearing housing can be moved in at least two degrees of freedom of motion relative to the device housing, wherein said resiliently yielding elements are resiliently yielding in axial and radial directions, and are arranged on the device housing concentrically to a rotational axis of the rotor and with uniform spacing around a periphery.

3. Device according to claim 2, wherein said resiliently yielding elements are each identical to one another.

4. Device according to claim 2, wherein the resiliently yielding elements are interconnected on a fastening face for the bearing housing by a bearing ring, and fixing elements adapted to fix the bearing housing are provided on the bearing ring.

5. Device according to claim 4, further comprising vibration sensors arranged on the bearing ring.

6. Device according to claim 4, further comprising an acceleration sensor arranged on the bearing ring.

7. Device according to claim 2, wherein the resiliently yielding elements each respectively have a shape of a ring sector with a radially internal sector portion, a radially external sector portion, and spring elements interconnecting the internal and external sector portions.

8. Device according to claim 7, wherein the resiliently yielding elements are each respectively fastened with the radially internal sector portion on the device housing and the radially external sector portion on the bearing housing or a bearing ring adapted to be connected to the bearing housing.

9. Device according to claim 7, wherein the spring elements interconnecting the internal and external sector portions are each respectively configured in an S-shape or a Z-shape.

10. Device according to claim 7, wherein the internal and external sector portions and the spring elements interconnecting the internal and external sector portions are manufactured in one piece.

11. Method for dynamically measuring the unbalance of a rotating rotor arranged in a device housing, the rotor being supported in a separate bearing housing and including a turbine wheel and a compressor wheel at opposite ends of the rotor, the method comprising the following steps:
using a device housing having a central aperture and a spiral channel connected thereto, both of which are adapted to receive the turbine wheel of the rotor;
fastening a bearing ring on the device housing with resiliently yielding elements interposed therebetween, the bearing ring having a central hole adapted to accommodate a ring flange provided on the bearing housing, and fixing elements adapted to fix the bearing housing on the bearing ring;
installing the bearing housing in the device housing with the ring flange accommodated in the central hole and fixing the bearing housing to the bearing ring by the fixing elements such that the turbine wheel is arranged in a working position in the central aperture and in the spiral channel of the device housing suitable for driving the turbine wheel, and such that the bearing housing and the rotor have at least two degrees of freedom of motion relative to the device housing through the resiliently yielding elements;
accelerating the rotor to a substantially normal working speed by directing an airflow through the spiral channel onto the turbine wheel;
measuring vibrations induced by an unbalance of the rotor while the rotor rotates at least one measuring speed corresponding to the substantially normal working speed;
determining a phase position of the vibrations induced by the unbalance with respect to an angular position of the rotor at the at least one measuring speed at which the vibrations induced by the unbalance are measured; and
using the measured vibrations induced by the unbalance and using the phase position to determine the unbalance of the rotor to be compensated.

12. Device for dynamically measuring the unbalance of a rotatable rotor supported in a bearing housing, and including a turbine wheel and a compressor wheel at opposite ends of the rotor, the device comprising > a device housing to which the rotor and the bearing housing can be attached in a working position suitable for driving the rotor at a substantially normal working speed, the device housing having a central aperture and a spiral channel connected thereto, both of which are adapted to receive the turbine wheel of the rotor and are configured and adapted to direct a spiraling airflow onto the turbine wheel,
> a bearing ring, having a central hole adapted to accommodate a ring flange provided on the bearing housing, and fixing elements adapted to fix the bearing housing on the bearing ring, and
> at least one resiliently yielding element,
> wherein the bearing ring is fastened on the device housing by the at least one resiliently yielding element interposed between the device housing and the bearing ring such that the bearing ring is movable in at least two degrees of freedom of motion relative to the device housing through the at least one resiliently yielding element.

13. Device according to claim 12, wherein the at least one resiliently yielding element comprises two spring rods on which the bearing ring is fastened so as to be attached to the device housing via the spring rods, the spring rods being arranged in a common plane parallel to a rotational axis of the rotor and extending in a direction of the rotational axis of the rotor.

14. Device according to claim 13, wherein the spring rods are arranged in a vertical plane and in a same region each have at least one bending portion of lesser stiffness whose stiffness is less in a horizontal direction than in a vertical direction.

* * * * *

UNITED STATES PATENT AND TRADEMARK OFFICE
CERTIFICATE OF CORRECTION

PATENT NO. : 7,654,138 B2
APPLICATION NO. : 12/084816
DATED : February 2, 2010
INVENTOR(S) : Thelen Page 1 of 1

It is certified that error appears in the above-identified patent and that said Letters Patent is hereby corrected as shown below:

Column 5,
Line 45, after "at", insert --at--;

Column 6,
Line 12, after "claim 2", replace "." by --,--;
Line 58, after "at", insert --at--;

Column 7,
Line 13, after "ring", delete --,--.

Signed and Sealed this
Twenty-first Day of June, 2011

David J. Kappos
*Director of the United States Patent and Trademark Office*